United States Patent [19]

Gorski

[11] 4,265,688

[45] May 5, 1981

[54] METHOD FOR PRODUCING SANDWICH TYPE STRUCTURAL COMPONENTS

[75] Inventor: Ekkehard Gorski, Buchholz, Fed. Rep. of Germany

[73] Assignee: Messerschmitt-Boelkow-Blohm Gesellschaft mit beschraenkter Haftung, Munich, Fed. Rep. of Germany

[21] Appl. No.: 928,877

[22] Filed: Jul. 28, 1978

[30] Foreign Application Priority Data

Aug. 11, 1977 [DE] Fed. Rep. of Germany ....... 2736132

[51] Int. Cl.³ .......................... B32B 31/16; B32B 3/12
[52] U.S. Cl. .................................. 156/73.1; 52/309.7;
  52/309.8; 52/309.9; 52/743; 156/78; 156/79;
  156/81; 156/91; 156/253; 156/293; 428/71;
  428/73; 428/103; 428/117; 428/138
[58] Field of Search ................. 52/309.7, 309.8, 309.9,
  52/743; 156/73.1, 78, 79, 81, 91, 92, 145, 146,
  155, 197, 293, 253; 428/63, 71, 73, 103, 116,
  117, 137, 138

[56] References Cited

U.S. PATENT DOCUMENTS 2,744,042  5/1956  Pace ................................ 428/117 X

| 3,644,158 | 2/1972 | Strumbos | 156/79 X |
| 3,886,023 | 5/1975 | Deplante | 156/253 |
| 4,076,877 | 2/1978 | Tanzen | 428/117 X |

OTHER PUBLICATIONS

W. Schönthaler et al., "Ultrasonic Joining of Duroplastics", *Kunststoffe*, vol. 64, No. 5 (1974) pp. 239, 240, 245.
H. Huble, "Ultrasonic Welding Today", *Industrie-Anzeiger*, vol. 97, No. 41 (May 21, 1975) pp. 810-813.

*Primary Examiner*—William A. Powell
*Assistant Examiner*—Robert A. Dawson
*Attorney, Agent, or Firm*—W. G. Fasse; D. F. Gould

[57] ABSTRACT

The present invention relates to a method for producing sandwich type structural components having a honeycomb core interposed between two cover layers. These cover layers are preferably made of fiber reinforced synthetic material. Force introduction points are formed in the structural components by insertion of a core filler mass in the form of a prepolymer which reacts to become a thermoplast. Force introducing connecting elements are connected to the force introducing points by melting these connecting elements into the core filler mass especially by using ultrasonic energy, for example, for an ultrasonic welding operation.

5 Claims, 4 Drawing Figures

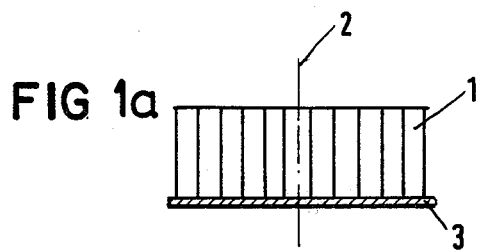
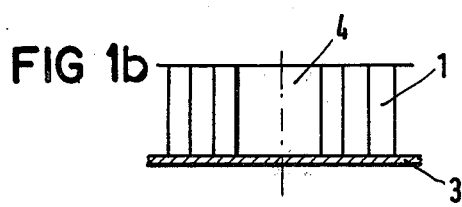
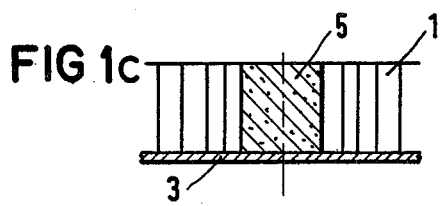
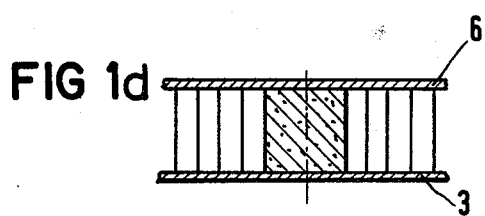
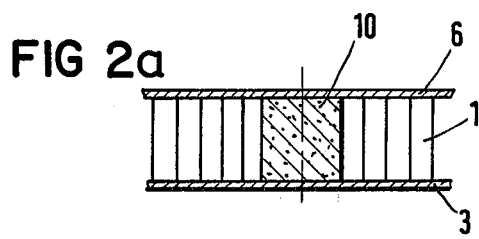
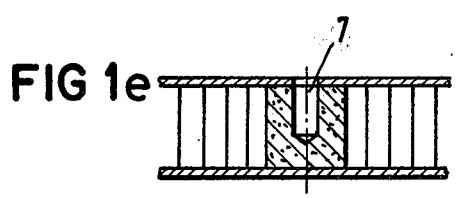
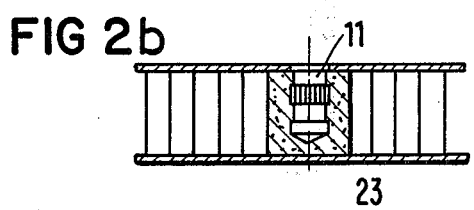
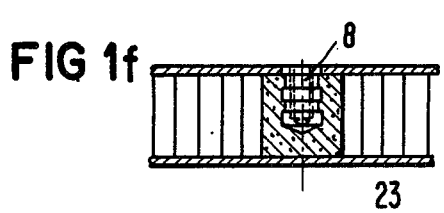

METHOD FOR PRODUCING SANDWICH TYPE STRUCTURAL COMPONENTS

BACKGROUND OF THE INVENTION

The invention relates to a method for producing sandwich type structural components preferably comprising cover layers of fiber reinforced synthetic material. Such structural components comprise essentially a lower and an upper cover layer as well as a honeycomb core or the like interposed between the cover layers. Force introducing points for connecting elements are provided at predetermined locations in the structural component. Such force introduction points are produced in that at the respective locations a core filler mass is inserted into the core.

According to a prior art method of the type described above, force introducing points are produced by using core filler masses of the reaction adhesive type. When the core is bonded to the cover layers, these reaction adhesives are cured by the application of heat to become thermoset materials. In order to introduce the securing elements, receiving bores are placed at the respective locations. The securing elements are inserted into the bores and fixed therein predominantly by means of reaction type castable masses. The main disadvantage of this prior art method is seen in that it is a rather expensive type of production due to the introduction of the highly viscous core filler mass into the bores and the subsequent adhesive bonding of the securing elements.

OBJECTS OF THE INVENTION

In view of the above it is the aim of the invention to achieve the following objects singly or in combination:

- to provide a method for the production of sandwich structural components of the type mentioned above, whereby the securing of the connecting elements may be accomplished at the least possible expense;
- to secure the connecting elements into the honeycomb core by means of a heat welding such as an ultrasonic welding;
- to avoid the mixing of the components of a reaction type castable mass; and
- to use such materials for the securing of the connecting elements in the honeycomb core that a pre-drilling of the cover layer and of the core filler mass may be obviated.

SUMMARY OF THE INVENTION

According to the invention there is provided a method for the production of sandwich structural components whereby connecting elements are secured at force introduction locations by means of a core filler mass of a thermoplastic and/or thermosetting mass. The connecting elements are inserted or introuded into the force introduction locations by melting these elements into said locations especially by the application of ultrasonic energy.

The invention has the advantage that mixing of the components of a reaction castable mass for the adhesive bonding of the connecting elements and the subsequent curing of the mass is obviated. In addition, the invention makes it possible to use inexpensive connecting elements in connection with the production of sandwich type structural components. Such inexpensive connecting elements are known for insertion into parts of synthetic material made by injection molding, whereby these connecting elements are inserted by means of ultrasonic energy. The use of this type of connecting elements in the manufacture of sandwich type structural components results in manufacturing and pricing conditions which are altogether very advantageous.

A preferred embodiment of the method according to the invention resides in that a thermoplastic polymeric mass in the form of a foamable granular material is used for the core filler mass and in that the insertion of the connecting element is accomplished by ultrasonic welding, whereby a pre-drilling of the cover layer and of the core filler mass is obviated.

BRIEF FIGURE DESCRIPTION

In order that the invention may be clearly understood, it will now be described, by way of example, with reference to the accompanying drawings, wherein:

FIGS. 1a to 1f illustrate the manufacturing sequence of a force introduction point using a thermoplastic stopper type insert;

FIGS. 2a and 2b illustrate a manufacturing sequence similar to that of FIG. 1, but employing a thermoplastic foam stopper type of insert;

DETAILED DESCRIPTION OF PREFERRED EXAMPLE EMBODIMENTS

Figure 3A:
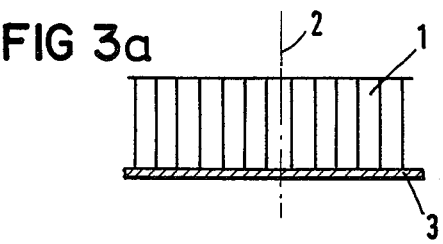
FIGS. 3a to 3d show a manufacturing sequence of a force introduction point by employing a granular material as the core filler mass.

FIGS. 1a to 1f illustrate a manufacturing sequence of a force introducing point. The sandwich type structural component is prefabricated to initially include the honeycomb core 1 and the lower cover layer 3 as shown in FIG. 1a. An axis 2 marks the location at which a force introducing point is to be produced. For this purpose a portion of the honeycomb core is cut out to provide a free space 4 as shown in FIG. 1b. Next, an insert 5 in the form of a stopper made of a prepolymer which reacts to become a thermoplastic polymeric mass is inserted into the space 4 as shown in FIG. 1c. The insert 5 fits properly into the space 4. Subsequently, the cover layer 6 is applied as shown in FIG. 1d and the structural component is glued together in an adhesive bonding apparatus not shown. The temperature and the duration of the heat application in the adhesive bonding apparatus will depend on the type of adhesive or glue used. In order to bond the core to the cover layers, adhesives are preferably used of the foil or sheet type. The adhesives are not shown in the present illustrations since they are well known in the art. Due to the adhesive bonding temperature the insert 5 becomes moldable in a plastic manner to a small extent so that if the dimension of the insert 5 is slightly larger than the space 4, it does not cause any disadvantages.

After the sandwich type structural component has cooled down, a receiving bore 7 is applied as shown in FIG. 1e. A connecting element 8 known as such is now inserted into the bore 7 and pressed into position in a melting operation, whereby preferably ultrasonic energy is applied. The material of the insert 5 is thus plastified at the interfaces between the insert 5 and the connecting elements 8, whereby the material of the insert 5 penetrates into the grooves and indentations of the connecting elements 8 as shown in FIG. 1f. After the polymeric mass has cooled down, the connecting element 8 is rigidly anchored in the sandwich structural component. The manufacturing costs for the insertion of the connecting elements 8 as just described, have been substantially reduced by using, according to the invention, thermoplastic polymeric masses and by melting the polymeric mass and thus the connecting elements into position.

Another modificaton of the method according to the invention is illustrated in FIGS. 2a and 2b. Subsequent to the preliminary steps as described with reference to FIGS. 1a and 1b, the insert 10 of FIG. 2, which is a foamable prepolymer which reacts to become a polymeric mass, is inserted as shown in FIG. 2a, whereupon the top layer 6 is applied as described above. Due the adhesive bonding of the cover layer 6 to the core 1 the foamed insert 10 is rigidly glued or adhesively bonded to the cover layers 3 and 6. An even stronger anchoring of the solid insert 5 or the foamed insert 10 may be accomplished with the sandwhich core 1 in an especially good manner by using a two component adhesive comprising an expanding agent which adhesive is applied to the insert 5 or 10. Where foam type inserts 10 are used one may accomplish a special, unexpected simplification of the further manufacturing steps in that with the applicaition of the ultrasonic welding technique the removal of the cover layer 6 for the insertion of the connecting element 11 is obviated because the ultrasonic welding heat softens the cover layer sufficiently for the insertion of the connecting element. A further unexpected effect is achieved in connection with foamed inserts 10 in that the connecting element 11 may be introduced into the foamed insert 10 without pre-drilling the latter because the ultrasonic welding heat also melts the foamed insert.

After the preparation of the structural component as illustrated in FIG. 2a, the connecting element 11 is introduced as shown in FIG. 2b by the application of pressure and heat. After the polymeric mass of the insert 10 has cooled down, the connecting element 11 is rigidly anchored in the structural component and loads may be applied to the structural component through the connecting element 11.

The insertion of the connecting elements 11 without pre-drilling as shown in FIG. 2 has yet another advantage residing in the compression of the gas filled melted portion of the inserted 10 which solidifies into a compact, solid material, whereby the connection of the elements 11 to the structural components exhibits an even higher strength and hence loadability than where a pre-drilling is required.

Figure 3B:
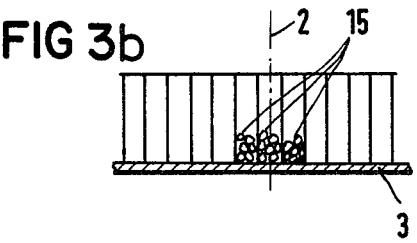
Figure 3C:
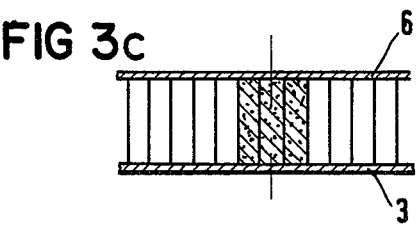
Figure 3D:
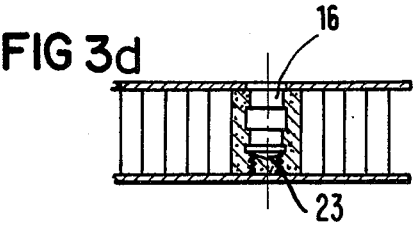

FIGS. 3a and 3d illustrate a preferred mode of performing the method according to the invention. The hollow core 1 is secured to the bottom cover layers 3 as shown in FIG. 3a whereby the honeycomb pockets are open upwardly. FIG. 3b shows the partial filling of several of such honeycomb pockets around the axis 2 with a granular material 5 of a foamable polymeric mass. After the pockets around the axis 2 are partially filled with the granular material 15, the upper cover layer 6 is applied and the sandwich type structural component is adhesively bonded in a bonding apparatus by the application of heat. This heat application causes the polymeric granular material 15 to foam and to completely fill the pockets of the honeycomb as shown in FIG. 3c. Thereafter but before the foamed material has solidified, the connecting element 16 is encased in the foamed material without any pre-drilling. An advantage of this modification of the invention is seen in that the removal of a portion of the core 1 in the area of the force introduction point has been obviated. It has been found, surprisingly, that the walls of the honeycomb core 1 do not impede the placing of the connecting element 16 to any extent worth mentioning. After the polymeric mass of the granular material 15 has been foamed and solidified, the connecting element 16 is rigidly anchored in the sandwich type structural component as illustrated in FIG. 3d.

Figure 4A:
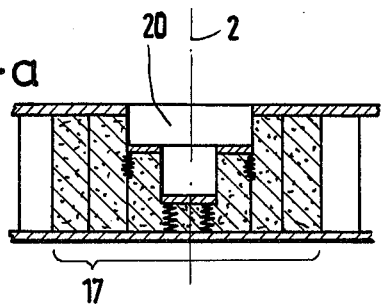
FIGS. 4a to 4c show a manufacturing sequence of a force introduction point including a movable securing element.
Figure 4B:
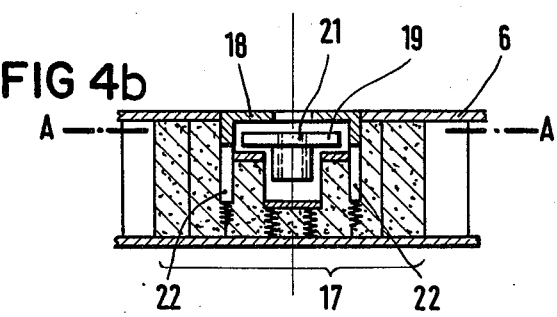
Figure 4C:
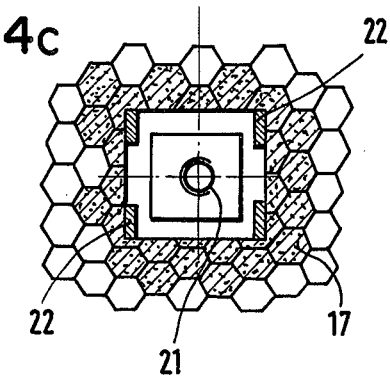

FIGS. 4a to 4c illustrate yet another modification of the method according to the invention. In this modification the pockets of the honeycomb core in an area 17 around the axis 2 as shown in FIG. 4a are filled with a thermoplastic polymeric mass and a receiving hole 20 is made around the location determined by the axis 2. If the material in the area 17 is a thermoplastic foam, the receiving hole 20 may be formed to have a configuration which does not have a rotational symmetry. This may be accomplished in a single working step by using an ultrasonic tool having a respective shape. In this particular instance, the hole 20 may have a lower portion having a cylindrical shape and an upper portion have a square shape. A member 19 is inserted into this depression, said member having an inner threading 21. Thereafter, a force transmitting element 18 is encased in the foamed honeycomb pockets with its four anchoring legs 22 in such a manner that the depression 20 is closed by the force transmitting element 18, whereby the top surface of the force transmitting element 18 is located flush with the top surface of the cover layer 6 as shown in FIG. 4b. The four anchoring legs 22 penetrate deeply into the foamed mass and establish by means of cut back recesses in the legs 22 a rigid connection between the force transmitting element and the sandwich type structural component. FIG. 4b illustrates the finished force introduction point.

FIG. 4c shows a horizontal section along the section line A—A in FIG. 4b. The insert 19 has such a dimension that the square shape of the upper portion of the recess 20 prevents the insert 19 from rotating. However, the insert 19 is dimensioned relative to the spacing of the four anchoring legs 22 in such a manner that a radial adjustment of the position of the insert 19 is possible so that the inner threading 21 may properly be aligned with the axis 2, whereby manufacturing tolerances may be compensated.

According to the invention all suitable thermoplastic polymeric masses may be employed, for example, polyvinylchloride, polystyrol, polyamides, polycarbonate, and similar thermoplastic synthetic materials. The inserts such as 10 may be made of the same materials with the addition of foaming agents which as such are well known in the art. The invention also contemplates that prepolymer products are inserted into the structural components, whereby these prepolymer products react to become thermoplastic material such as polymethacrylate or polyamide. The reaction may be started by the infusion of different types of energy, for example, heat or radiation. The granular material 15 may, for example, comprise a polystyrol including a foaming agent for foaming the pockets in the honeycomb. Such polystyrol is also known under the trade name of "Styropor". Instead of using a pure thermoplastic core filler mass, it is also possible to use a mixture of thermoplastic and thermosetting granular materials which remain fluid as much as possible for filling the honeycomb pockets. During the curing or hardening process of the sandwich type structure the thermosetting component would assure the formation of the insert block whereas the thermoplastic component would assure the subsequent weldability of the connecting element into the insert block, especially by using ultrasonic energy. Incidentally, the connecting elements 8 in FIG. 1, 11 in FIG. 2b, and 16 in FIG. 3d are provided with a conical tip 23 as shown in these figures.

Although the invention has been described with reference to specific example embodiments, it will be appreciated that it is intended, to cover all modifications and equivalents within the scope of the appended claims.

What is claimed is:

1. A method for manufacturing a sandwich type structural component, comprising the following steps:
    (a) providing a prefabricated honeycomb core having open pockets therein,
    (b) bonding a first cover layer to one surface of the honeycomb core,
    (c) introducing a thermoplastic prepolymer including a foaming agent into said pockets at least at one predetermined location of the structural component, said thermoplastic prepolymer being capable of reacting with said foaming agent to become a thermoplastic foam type material,
    (d) bonding a second cover layer to the opposite surface of the honeycomb structure,
    (e) applying ultrasonic energy to said at least one location to melt said thermoplastic foam type material and to sufficiently soften one cover layer for the insertion of a connecting means directly through the cover layer without predrilling, and
    (f) inserting said connecting means directly into the still soft location.

2. The method of claim 1, wherein said thermoplastic prepolymer is a solid block of a thermoplastic mass which is inserted into said honeycomb core at said predetermined location.

3. The method of claim 1, wherein said thermplastic prepolymer is a granular material.

4. The method of claim 3, wherein said step of introducing comprises pouring said granular material into said honeycomb core at said predetermined location.

5. The method of claim 1, further comprising providing said connecting means with a tip to facilitate the insertion through the softened cover layer.

* * * * *